US007775456B2

(12) United States Patent  
Gopalan et al.

(10) Patent No.: US 7,775,456 B2  
(45) Date of Patent: Aug. 17, 2010

(54) FLUIDIC DEVICE YIELDING THREE-DIMENSIONAL SPRAY PATTERNS

(75) Inventors: Shridhar Gopalan, Westminster, MD (US); Gregory Russell, Catonsville, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 332 days.

(21) Appl. No.: 11/820,044

(22) Filed: Jun. 18, 2007

(65) Prior Publication Data

US 2008/0011868 A1 Jan. 17, 2008

Related U.S. Application Data

(60) Provisional application No. 60/814,607, filed on Jun. 16, 2006.

(51) Int. Cl.
*B05B 17/04* (2006.01)
(52) U.S. Cl. .................. 239/11; 239/589.1; 239/284.1; 137/809; 137/812
(58) Field of Classification Search ............. 239/589.1, 239/284.1, 284.2, 11; 137/812, 813, 809, 137/810
See application file for complete search history.

(56) References Cited

U.S. PATENT DOCUMENTS

| | | | | |
|---|---|---|---|---|
| 3,563,462 A | 2/1971 | Bauer | ................... | 239/456 |
| 4,052,002 A | 10/1977 | Stouffer | ................... | 239/4 |
| 4,151,955 A | 5/1979 | Stouffer | ................... | 239/11 |
| 4,157,161 A | 6/1979 | Bauer | ................... | 239/11 |
| 4,185,777 A * | 1/1980 | Bauer | ................... | 239/394 |
| 4,231,519 A | 11/1980 | Bauer | ................... | 239/4 |
| 4,398,664 A | 8/1983 | Stouffer | ................... | 239/11 |
| 4,463,904 A | 8/1984 | Bray | ................... | 239/284 |
| 4,508,267 A | 4/1985 | Stouffer | ................... | 239/11 |
| 4,562,867 A | 1/1986 | Stouffer | ................... | 137/811 |
| 5,035,361 A | 7/1991 | Stouffer | ................... | 239/589.1 |
| 5,181,660 A | 1/1993 | Stouffer et al. | ................... | 239/589.1 |
| 5,213,269 A | 5/1993 | Srinath et al. | ................... | 239/589.1 |
| 5,749,525 A | 5/1998 | Stouffer | ................... | 239/284.1 |
| 5,820,034 A | 10/1998 | Hess | ................... | 239/589.1 |
| 5,845,845 A | 12/1998 | Merke et al. | ................... | 239/1 |
| 5,906,317 A | 5/1999 | Srinath | ................... | 239/284.1 |
| 5,971,301 A | 10/1999 | Stouffer et al. | ................... | 239/589.1 |
| 6,062,491 A | 5/2000 | Hahn et al. | ................... | 239/284.2 |
| 6,186,409 B1 | 2/2001 | Srinath et al. | ................... | 239/1 |
| 6,240,945 B1 | 6/2001 | Srinath et al. | ................... | 137/14 |
| 6,253,782 B1 | 7/2001 | Raghu | ................... | 137/14 |
| 6,464,150 B1 | 10/2002 | Zimmer et al. | ................... | 239/284.1 |
| 7,014,131 B2 | 3/2006 | Berning et al. | ................... | 239/589.1 |
| 7,111,800 B2 | 9/2006 | Berning et al. | ................... | 239/589.1 |
| 7,152,808 B2 * | 12/2006 | Jenkins | ................... | 239/1 |

(Continued)

*Primary Examiner*—Dinh Q Nguyen  
(74) *Attorney, Agent, or Firm*—Larry J. Guffey

(57) ABSTRACT

A fluidic device, that operates on a pressurized liquid flowing through it to generate an oscillating spray having desired three-dimensional flow characteristics, includes a member that has fabricated within it at least two liquid flow channels that are configured in the form of a fluidic circuit having an inlet and an outlet and a centerline therebetween. These flow channels are further configured so that the straight line projections of their centerlines, that extend from their outlets, intersect at a prescribed intersection angle, $\Theta$, and the outlets are separated by a characteristic separation distance, "w." We have found that the values of the intersection angle, $\Theta$, and separation distance, "w," can be are chosen so as to yield the desired three-dimensional flow characteristics of the spray.

8 Claims, 3 Drawing Sheets

U.S. PATENT DOCUMENTS

| | | | |
|---|---|---|---|
| 7,354,008 B2 * | 4/2008 | Hester et al. | 239/589.1 |
| 2006/0043110 A1 | 3/2006 | Miyauchi | 222/129.1 |
| 2006/0108442 A1 | 5/2006 | Russell et al. | 239/102.1 |
| 2007/0295840 A1 | 12/2007 | Gopalan et al. | 239/589.1 |

* cited by examiner

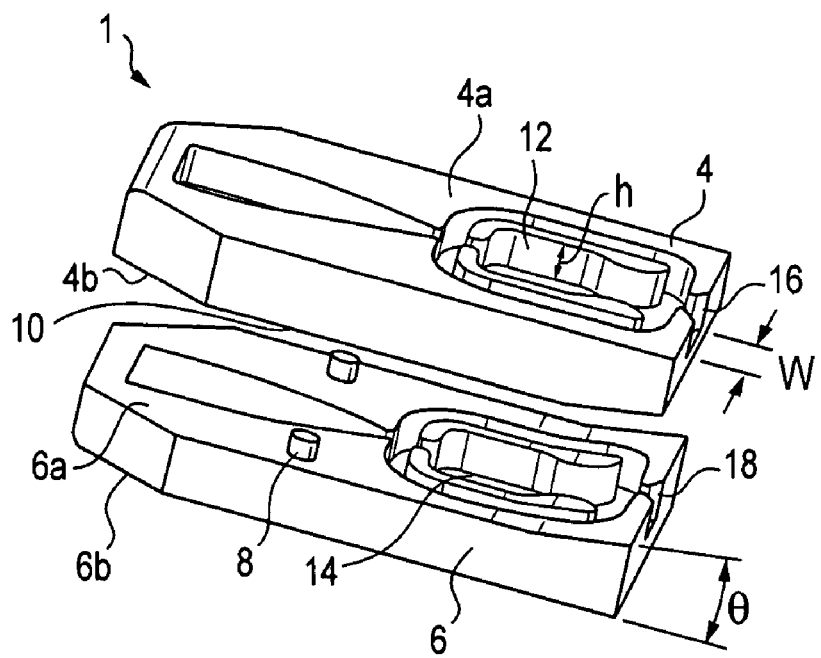
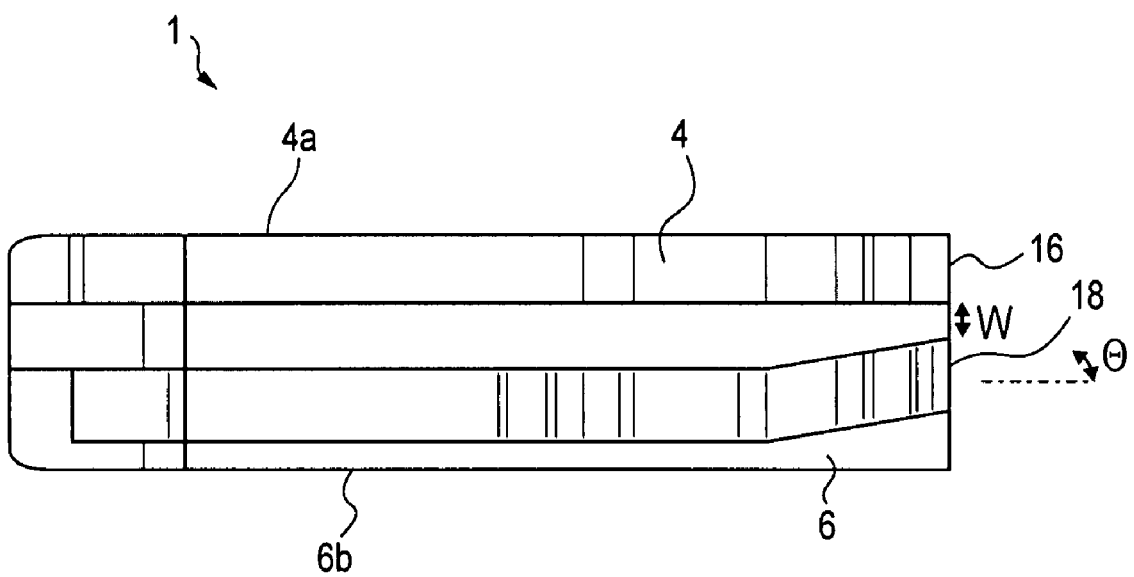

FLUIDIC DEVICE YIELDING THREE-DIMENSIONAL SPRAY PATTERNS

CROSS-REFERENCE TO RELATED APPLICATION

This application is related to the present Assignee's U.S. Pat. Nos. 7,014,131 and 7,111,800 and U.S. Patent Publication No. (USPPN) 2006/0108442 and U.S. patent application Ser. No. 11/805,802. This application claims the benefit of Provisional Patent Application No. 60/814,607 filed Jun. 16, 2006 by the present inventors. The teachings of these prior patent materials are incorporated herein by reference to the extent that they do not conflict with the teachings herein.

BACKGROUND OF THE INVENTION

1. Field of the Invention

This invention relates to fluid handling processes and apparatus. More particularly, this invention relates to new methods and apparatus for enclosing and mounting fluidic oscillators or inserts so as to improve their performance.

2. Description of the Related Art

Fluidic inserts or oscillators are well known for their ability to provide a wide range of distinctive liquid sprays. The distinctiveness of these sprays is due to the fact that they are characterized by being oscillatory in nature, as compared to the relatively steady state flows that are emitted from standard spray nozzles.

The flow patterns produced by the liquid emitted from a typical fluidic oscillator may be considered to be an essentially temporally varying flow of a liquid jet or spray that issues from the oscillator into a surrounding gaseous environment and breaks into droplets which are distributed primarily transversely (thus, we speak of their flow patterns as being "two-dimensional and planar") so that the resulting spray is said to be characterized by a prescribed "fan angle" and "thickness" (see FIGS. 1 and 11 in the previously cited and related USPPN 2006/0108442 for the terminology and coordinate system previously introduced and being used herein to discuss the unsteady, oscillating flow of the liquid droplets from a fluidic oscillator (e.g., in FIG. 11: oscillating at a prescribed frequency in the x-y plane so as to create the horizontal fan angle, $\phi$, and a rate of spread angle, $\theta$, in the x-z plane which we define as the spray's "thickness")). Such spray patterns may be described by the definable characteristics of their droplets (e.g., the volume flow rate of the spray, the spray's area of coverage, the spatial distribution of droplets in planes perpendicular to the direction of flow of the spray and at various distances in front of the oscillator's outlet, the average droplet velocities, the average size of the droplets, and the frequency at which the droplets impact on an obstacle in the path of the spray).

A fluidic insert is generally thought of as a thin, rectangular member that is molded or fabricated from plastic and has an especially-designed, liquid flow channel (i.e., fluidic circuit) fabricated into its boundary surface (assuming that this fluidic insert is of the standard type that is to be inserted into the cavity of a housing whose inner walls are configured to form a liquid-tight seal around the insert and form an outside wall for the insert's boundary surface which contains the especially designed flow channel).

There are many well known designs of fluidic circuits that are suitable for use with such fluidic inserts. Many of these have some common features, including: (a) at least one power nozzle configured to greatly accelerate the movement of the liquid that flows under pressure through the insert so that it separates from the walls downstream of the power nozzle so as to form an essentially "free" jet downstream of the power nozzle, (b) an interaction chamber through which the liquid flows and in which the flow phenomena is initiated that will eventually lead to the spray from the insert being of an oscillating nature, (c) an liquid inlet, (d) a pathway that connects the inlet and the power nozzle/s, (e) an outlet or throat from which the liquid sprays from the insert, and (f) an expansion section downstream of the throat.

Examples of fluidic circuits may be found in many patents, including the present Assignee's U.S. Pat. Nos. 3,563,462 (Bauer), 4,052,002 (Stouffer & Bray), 4,151,955 (Stouffer), 4,157,161 (Bauer), 4,231,519 (Stouffer), which was reissued as RE 33,158, U.S. Pat. Nos. 4,508,267 (Stouffer), 5,035,361 (Stouffer), 5,213,269 (Srinath), 5,971,301 (Stouffer), 6,186,409 (Srinath) 6,253,782 (Raghu), 7,267,290 (Gopalan & Russell), 7,472,848 (Gopalan & Russell), 7,478,764 (Gopalan), and 7,651,036 (Gopalan).

Despite much prior art relating to the development of fluidic circuits, the nature of the housings or enclosures that surround fluidic inserts and the methods for mounting fluidic inserts had, until recently, changed only slowly over the years. Representative examples of the housings for fluidic inserts and the methods for mounting them are described in U.S. Pat. Nos. 5,845,845, 6,062,491, 6,464,150, 7,014,131, and 7,111,800 and in USPPNs 2004/0227021, 2006/0108442 and 2006/0043110.

As fluidic inserts have continued to be used in more types of applications, the opportunity has arisen to re-examine and improve upon the design of their housings and mounting methods as a way to improve upon the overall spraying performance of the nozzle assemblies, etc. which use fluidic inserts or oscillators. This is especially important in the creation of fully "three-dimensional spray patterns" (as opposed to the primarily two-dimensional spray patterns that are yielded by present fluidic spray devices).

Commercial three-dimensional, liquid sprays are usually produced in only a few ways: (a) a swirl nozzle, that produces a circular spray pattern which can be full of small droplets or hollow due to the nozzle's high rotational speeds, and (b) shearing the spray by means of a "spoon" type nozzle (mostly used in the headlamp industry) which also typically yields small, low velocity (lacking in power) droplets. In general, these spray devices do not yield the often desired "powerful (high velocity, larger size droplets), three-dimensional" sprays needed for assorted "cleaning on impact" applications. Further improvements are needed in the creation of "powerful, three-dimensional" liquid spray devices.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide novel mounting methods for fluidic inserts that improving upon the "three-dimensional" spray performance of fluidic spray devices.

It is also an object of the present invention to provide fluidic spray devices or assemblies that can provide specific types of desired "three-dimensional" sprays that have heretofore not been achievable with conventional fluidic technology.

It is a further object of the present invention to provide improved and more versatile fluidic devices are ideally designed for a wide range of service applications.

It is a still further object of the present invention to provide fluidic devices that allow a user to better direct and control the location of the areas being wetted by the sprays from such devices.

These and other objects and advantages of the present invention will become readily apparent as the invention is better understood by reference to the accompanying summary, drawings and the detailed description that follows.

SUMMARY OF THE INVENTION

Recognizing the need for the development of fluidic devices that can provide stronger sprays which have a more three-dimensional character, the present invention is generally directed to satisfying the needs set forth above and overcoming the limitations seen in the prior art devices and methods.

In accordance with the present invention, a fluidic device, that operates on a pressurized liquid flowing through it to generate an oscillating spray having desired three-dimensional flow characteristics, includes a member that has fabricated within it at least two liquid flow channels that are configured in the form of a fluidic circuit having an inlet and an outlet and a centerline therebetween. These flow channels are further configured so that the straight line projections of their centerlines, that extend from their outlets, intersect at a prescribed intersection angle, $\Theta$, and the outlets are separated by a characteristic separation distance, "w." We have found that the values of the intersection angle, $\Theta$, and separation distance, "w," can be are chosen so as to yield the desired three-dimensional flow characteristics of the spray.

Thus, there has been summarized above, rather broadly and understanding that there are other preferred embodiments which have not been summarized above, the present invention in order that the detailed description that follows may be better understood and appreciated. There are, of course, additional features of the invention that will be described hereinafter and which will form the subject matter of the later presented claims to this invention.

BRIEF DESCRIPTION OF THE DRAWINGS

FIG. 1 shows a perspective view of a preferred embodiment of the present invention.

FIG. 2 shows the embodiment of FIG. 1 after its two halves have been joined together.

DESCRIPTION OF THE PREFERRED EMBODIMENT

Figure 3:
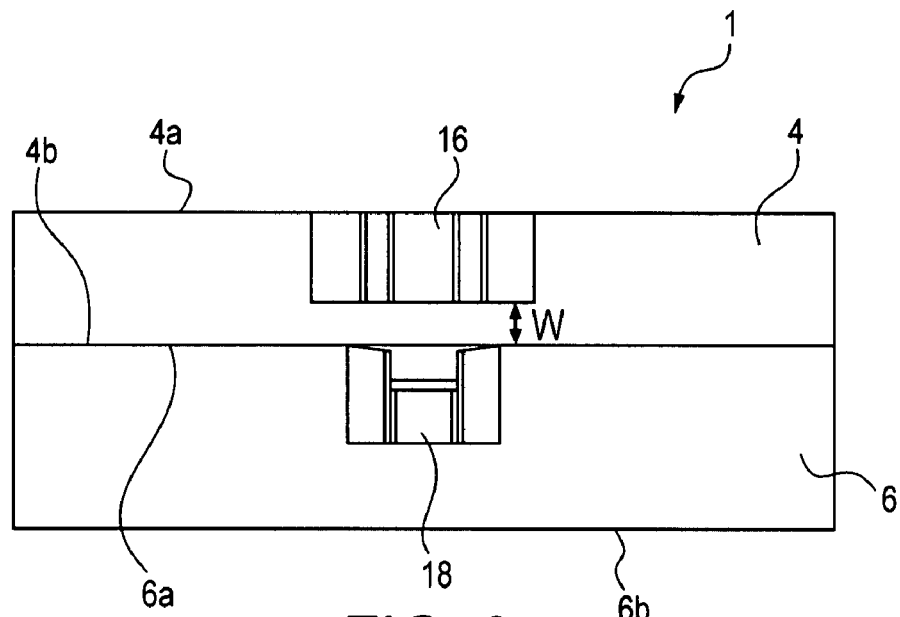
FIG. 3 shows a front view of the embodiment shown in FIG. 2.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

A common problem encountered in developing and producing fluidic oscillators or inserts for use in many service applications is designing a fluidic circuit which can give what can often be very demanding and precise spray characteristics (e.g., at flow rates of 400 ml/minute and operating pressures of 9 psig, uniform coverage with spray droplets of a target area located approximately 25 cm in front of the sprayer and having a target area width of approximately 80 cm).

Since such inserts and their enclosures are typically made by plastic injection molding methods, those knowledgeable with such manufacturing methods will understand that such manufacturing methods impose further constraints on the geometry of such inserts and their enclosures.

In striving to improve the performance of various types of fluidic sprayers, we have discovered that there are significant opportunities to create and introduce new enclosures and mounting methods for these fluidic oscillators that appreciably improve their performance.

Shown in FIG. 1 is a preferred embodiment of our present invention which we refer to as a "butterfly or three-dimensional fluidic device" 1 because of the nature of the geometric pattern of the spray which it is capable of generating.

It is seen to consist of two fluidic inserts 4, 6 that have been especially configured so as to be mated together with the top **6*a* of the lower insert 6 being joined with the bottom 4*b* of the upper insert 4. A guide post 8 in the top 6*a* of the lower insert 6 fits into a cavity 10 (shown in dashed lines) in the bottom 4*b* of the upper insert 4** so as to ensure their proper mating.

In many ways, each of these inserts are configured in the typical manner (i.e., they are thin, rectangular members having a fluidic circuit 12, 14 fabricated into their respective top surfaces **4*a*, 6*a***). Typically they would be inserted into the cavity of their own housings whose inner walls would be configured to form a liquid-tight seal around the insert and form an outside wall for the insert's boundary surface/s which contain the especially designed flow channels.

However, in the present invention, this pair of inserts are modified and joined in such a manner so that their combined sprays yield previously-never-before-seen, three-dimensional spray patterns.

The fluidic circuit or flow path 14 for the lower insert 6 is seen to be unique for the fact that it introduces an upward slope of angle Θ in this circuit's flow channel floor at a point that is near the channel's downstream end. To accommodate for this change in the lower insert, the upper insert's bottom surface **4*b*** is given a matching slope, Θ.

This angled section in the floor of the lower insert is seen to contribute to a unique, prescribed interaction between this fluidic device's 1 pulsating exhaust jets (i.e., sprays of liquid droplets, each of which oscillates transversely at a prescribed frequency, see FIGS. 1 and 11 of previously cited and related USPPN 2006/0108442 whose teaching were previously incorporated herein by reference). When the two fluidic circuits are also configured such that the sprays from them are independent (i.e. there is no synchronization—see col. 8, lines 21-33 of this application's previously referenced and related U.S. Pat. No. 7,014,131 whose teaching were also previously incorporated herein by reference for a discussion of how to configure two adjoining fluidic circuits so that the flows from them will be synchronized or non-synchronized), the two oscillating sprays go in and out of phase periodically.

When the two oscillating sprays from the non-synchronized fluidic circuits periodically come into phase or merge, they tend to produce an output that lies in a plane between each of their individual planes (e.g., the horizontal plane of the upper insert and the Θ angled slope of the lower insert). When the two oscillating sprays from the non-synchronized fluidic circuits periodically go out of phase or miss, they oscillate in their own planes. When the two oscillating sprays from the non-synchronized fluidic circuits periodically merge, their output is a more three dimensional spray with an unsteady spray thickness that has been found to be a function of the slope or angle between the fluidic circuits' intersecting centerlines (e.g., Θ)—see in FIG. 2 where these inserts are shown in their joined state. The net result of these two intersecting, non-synchronized fluidic circuits is a merged spray that exhibits an oscillating thickness (in addition to the droplets' transverse oscillations which we describe in terms of their fan angle). Thus, these two intersecting, non-synchronized fluidic circuits yield a spray whose unsteady, oscillating thickness opens and closes periodically several times a second, similar to the flapping wings of a butterfly.

Also seen in FIG. 2 is the separation distance "w" between the outlets 16, 18 of the two flow channels (in this instance, it is also the depth of upper insert's floor at its outlet). See also FIG. 3 for a front view of the present invention which better shows this depth "w." This separation distance can be characterized as being in some way proportional to the average height or dimension "h" of the insert's flow channel as measured between the channel's bottom surface and the boundary surface into which the flow channel is fabricated. In our experiments, viable ratios for these dimension have been found to be in the range of w/h=0.1-20 depending upon how far downstream it is that it is wished to have these sprays initially begin to interact. Meanwhile, characteristic intersection angles, Θ, have been trialed in the range of 5-120 degrees and found to give the desired improvement in the three-dimensionality and strength of the resulting sprays.

Thus, the present invention is seen to be a fluidic device 1 which consists of an assembly of especially configured fluidic inserts that are joined together so as to produce a desired oscillating, three-dimensional spray which have required fan angles and thicknesses. Various embodiments of the present invention are suitable for any application that requires a three-dimensional spray (e.g., windshield wiper, lawn and garden, headlamp wiper, irrigation applications, showerheads).

For example, we have found that a version of the fluidic device 1 shown in FIGS. 1-3 is capable of cleaning auto headlamps at considerably lower pressures (e.g., at windshield washer pump pressures of 20 psi) than the 40 psi pressure that is usually used in headlamp pumps.

It should also be noted that the fluidic circuit of each of the inserts that comprise this fluidic device 1 need not be the same, and that they can be chosen from an array of such known circuits (e.g., Mushroom—U.S. Pat. No. 6,253,782, Island—U.S. Pat. No. 4,151,955, Three-Jet-Island—USPPN 2005/0087633, Feedback—U.S. Pat. No. 4,052,002, Box—U.S. Pat. No. 5,971,301).

Since each of such fluidic circuits is characterized by its own droplet size, velocity, etc., the fluidic device 1 of the present invention can produce a wide variety of drop sizes and velocities by using various combinations of these fluidic circuits. For example, for lawn and garden applications, it may be advisable to use two inserts in the present invention's fluidic device 1 that utilizes three-jet-island circuits.

It is perhaps instructive to point out another difference between the sprays yielded by the present invention and those generated with by prior spray devices that use the interaction of two steady jets to create a sheet or a fan spray. This spray geometry differs greatly from the butterfly sprays yielded by the hit or miss nature of the oscillating sprays from the present invention.

Figure 4:
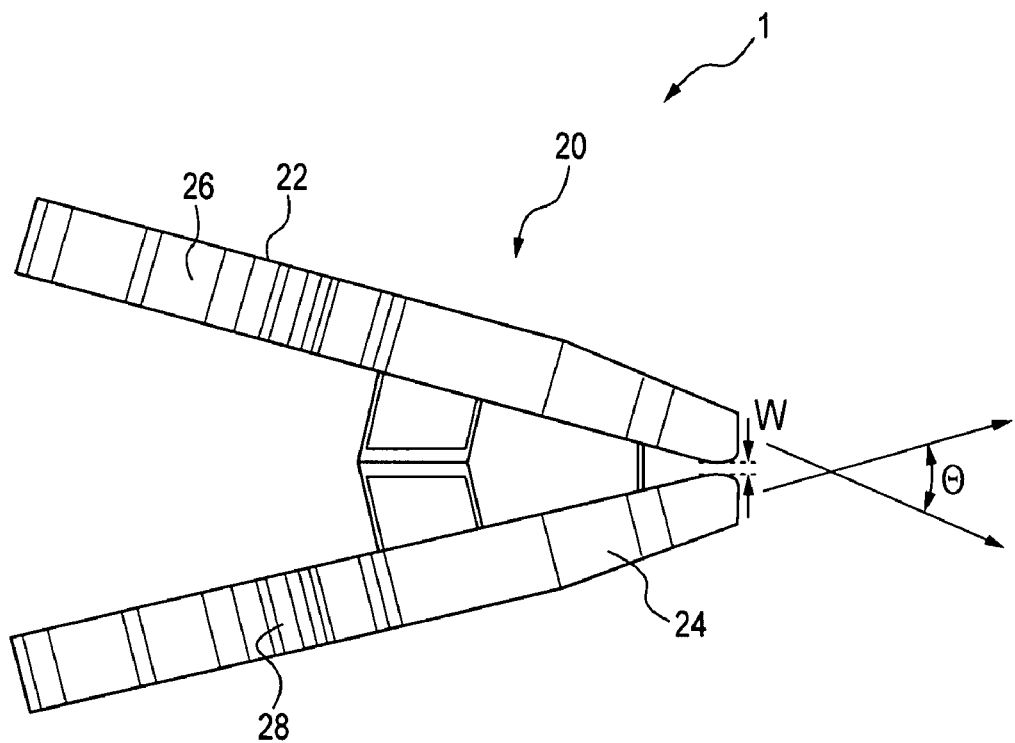
FIG. 4 shows a second preferred embodiment of the present invention and its primary housing.

It should also be noted that there are other ways of orienting, mounting, holding and constructing such fluidic inserts so that they yield oscillating sprays whose centerlines have an included angle of Θ. For example, see FIG. 4 which shows a primary housing 20 that has been configured with cavities 22, 24 to hold the fluidic inserts 26, 28 so that the centerlines of their flow channels intersect at the desired intersection angle of Θ.

Figure 5:
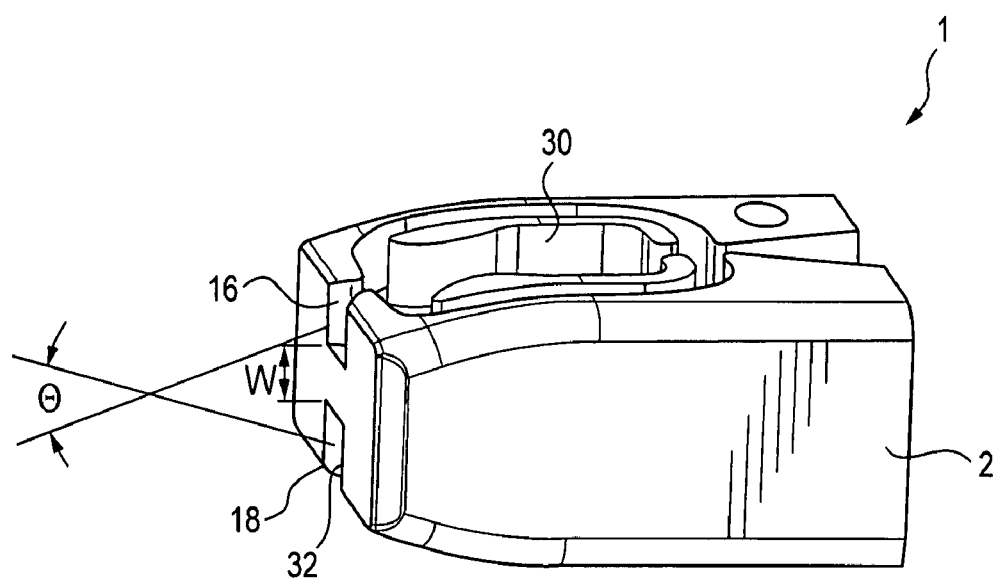
FIG. 5 shows a third preferred embodiment of the present invention.
Figure 6:
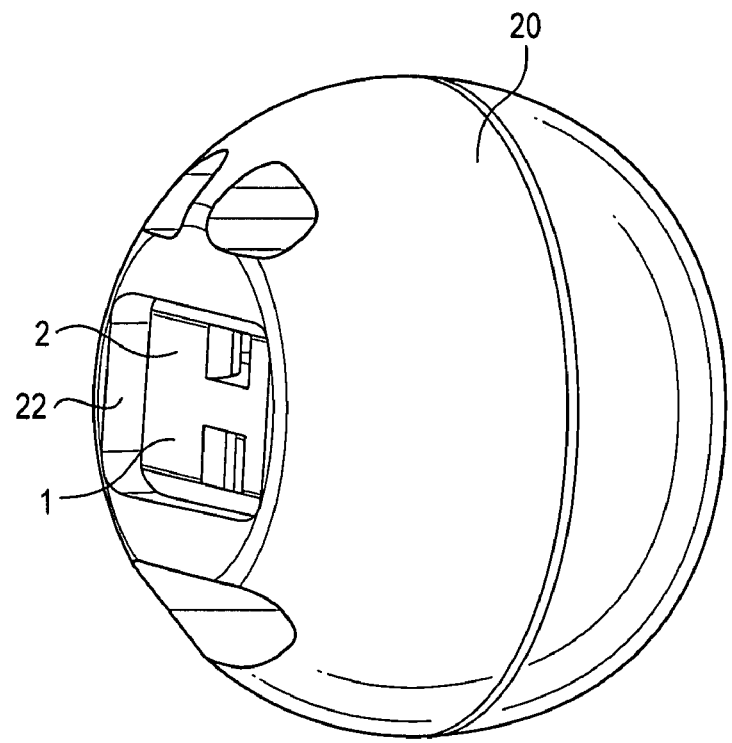
FIG. 6 shows the embodiment of FIG. 5 after it has been inserted into a primary housing.

Yet another embodiment of the present invention is shown in FIGS. 5 and 6 where we see a member 2 which has two boundary surfaces in which each of these has located with or proximate it a flow channel 30, 32 in the form of a fluidic circuit. In this instance we see that the flow channels near their outlets 16, 18 have been directed towards each other so as to yield the desired intersection angle, Θ, and separation distance "w". Additionally, we see in FIG. 5 that these redirections in the flow channels near the outlets are achieved by applying a smooth, continuous curvature to both the flow channels' bottom surfaces or floors and also to the boundary surfaces from which material has been removed to form these flow channels. The advantage of this configuration is that it minimizes pressure losses through these parts of the circuits while preserving the height of the flow channel which can be said to be characterized by an average dimension "h" that is held constant while the channel is being redirected. This configuration serves to enable the present invention to better achieve its stated objective of yielding a powerful (high velocity, larger size droplets) three-dimensional spray. FIG. 6 shows this member 2 being held by a primary housing 20 having a cavity 22 in which the member 2 has been inserted.

The foregoing is considered as illustrative only of the principles of the invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as will be later set forth in claims to the present invention.

We claim:

1. A fluidic device that operates on a pressurized liquid flowing through said device to generate in the gaseous environment surrounding said device a three-dimensional, oscillating spray of liquid droplets having desired flow characteristics, said device comprising:

a member having two boundary surfaces, wherein each of said boundary surfaces having fabricated therein a liquid flow channels, wherein each of said liquid flow channels being configured in the form of a fluidic circuit having an inlet, an outlet, a centerline and a bottom surface which extends therebetween, and a characteristic dimension "h", wherein each of said liquid flow channels being further configured proximate said outlet of said flow channel so that said channel bottom surface and said boundary surface in which said channel is fabricated assume a continuous curvature so as to redirect the direction of said channel centerline to cause each of said channels to converge towards the other said channel while keeping said channel characteristic dimension "h" constant along the length of said channel over which said channel redirection is imposed, wherein the straight line projections of said centerlines, that extend from said circuit outlets, intersect at a prescribed intersection angle, Θ, and said outlets are separated by a characteristic separation distance, "w," and wherein the values of said intersection angle, Θ, and said separation distance, "w," and the configurations of said fluidic circuits are chosen so as to yield the desired flow characteristics of said spray.

2. The fluidic spray device as recited in claim 1, wherein:
said member having a first and a second portion and each portion having a top and a bottom boundary surface,
one of said flow channels being located proximate the top boundary surface of each of said portions, and
said bottom boundary surface of said first portion and said top boundary surface of said second portion being configured so as to mate together and allow said bottom boundary surface of said first portion to form a boundary and liquid-tight seal for the top portion of the flow channel of said second portion.

3. The fluidic spray device as recited in claim 1, wherein:
said member having two cavities,
a pair of fluidic inserts, each of said inserts having fabricated within said insert one of said liquid flow channels,
wherein each of said cavities having sidewalls that are configured to receive one of said inserts and to enclose said insert with a liquid-tight seal,
wherein said cavities are further configured in said members so as to provide for said intersection angle, Θ, and said characteristic separation distance, "w".

4. The fluidic spray device as recited in claim 1, wherein:
the ratio of said characteristic dimension, "w", to said flow channel characteristic dimension, "h", is in the range of: w/h=1-20, and
said intersection angle, Θ, is in the range of 5 to 120 degrees.

5. A method of forming a fluidic device that operates on a pressurized liquid flowing through said device to generate in the gaseous environment surrounding said device a three-dimensional, oscillating spray of liquid droplets having desired flow characteristics, said method comprising the steps of:
forming a member having two boundary surfaces,
fabricating within each of said boundary surfaces a liquid flow channels,
configuring each of said liquid flow channels in the form of a fluidic circuit having an inlet, an outlet, a centerline and a bottom surface which extends therebetween, and a characteristic dimension "h",
configuring each of said liquid flow channels proximate said outlet of said flow channel so that said channel bottom surface and said boundary surface in which said channel is fabricated assume a continuous curvature so as to redirect the direction of said channel centerline to cause each of said channels to converge towards the other said channel while keeping said channel characteristic dimension "h" constant along the length of said channel over which said channel redirection is imposed,
wherein the straight line projections of said centerlines, that extend from said circuit outlets, intersect at a prescribed intersection angle, Θ, and said outlets are separated by a characteristic separation distance, "w," and
wherein the values of said intersection angle, Θ, and said separation distance, "w," and the configurations of said fluidic circuits are chosen so as to yield the desired flow characteristics of said spray.

6. The method as recited in claim 5, further comprising the steps of:
forming said member with a first and a second portion and each portion having a top and a bottom boundary surface,
locating one of said flow channels proximate the top boundary surface of each of said portions, and
configuring said bottom boundary surface of said first portion and said top boundary surface of said second portion so as to mate together and allow said bottom boundary surface of said first portion to form a boundary and liquid-tight seal for the top portion of the flow channel of said second portion.

7. The method as recited in claim 5, further comprising the steps of:
forming said member with two cavities,
providing a pair of fluidic inserts,
fabricating within each of said inserts one of said liquid flow channels,
configuring each of said cavities so as to receive one of said inserts and to enclose said insert with a liquid-tight seal, and
configuring said cavities in said members so as to provide for said intersection angle, and said characteristic separation distance, "w".

8. The method as recited in claim 5, wherein:
the ratio of said characteristic dimension, "w", to said flow channel characteristic dimension, "h", is in the range of: w/h=1-20, and
said intersection angle, Θ, is in the range of 5 to 120 degrees.

\* \* \* \* \*